United States Patent [19]

Sharp et al.

[11] 3,841,260

[45] Oct. 15, 1974

[54] DIET MANAGEMENT DEVICE

[76] Inventors: Vance R. Sharp, 109 Balsam Rd., Oak Ridge, Tenn. 37830; Delbert L. Hollingsworth, Rt. 3, Box 12B, Leesburg, Fla. 32748

[22] Filed: Sept. 24, 1973

[21] Appl. No.: 400,569

[52] U.S. Cl. .................................. 116/136, 235/90
[51] Int. Cl. ............................................... A63f 1/18
[58] Field of Search ....................... 235/90; 116/136

[56] References Cited
UNITED STATES PATENTS

| | | | |
|---|---|---|---|
| 805,988 | 11/1905 | Palmer | 116/136 |
| 2,509,659 | 5/1950 | Wassell | 116/136 |
| 3,145,482 | 8/1964 | Edwards | 116/136 X |
| 3,195,813 | 7/1965 | Hart | 116/136 X |

*Primary Examiner*—Lawrence R. Franklin
*Attorney, Agent, or Firm*—Herman L. Holsopple

[57] ABSTRACT

A device is described whereby persons on diets can keep track of allowable foodstuffs for 24-hour time periods by means of an apparatus comprising a thin, color-coded sheet member having an array of apertures arranged in a plurality of mutually perpendicular rows, a multiplicity of removable pegs conveniently rounded to be rotatably secured in the holes, arrangement of said holes being indicative of foodstuffs to be allowed for each meal of the day, and said pegs being color-coded to represent foodstuffs which are essential dietary components of calculated caloric value.

Thus, where a person is aware of the total number of calories he is allowed per 24-hour time period as represented by one or more pegs in a board, color-coded to show specific food groups, then it is a simple matter to utilize the device to program a balanced diet for each meal during said 24-hour time period.

4 Claims, 4 Drawing Figures

DIET MANAGEMENT DEVICE

BACKGROUND OF THE INVENTION

The invention described herein relates to a mealtime programmer for dieters and more particularly to a diet management device for keeping track of dietary foodstuffs which may be eaten by a dieter during 24-hour time periods and during each meal thereof. It is an improvement of known calorie counters such as that of J. H. Hart, U.S. Pat. No. 3,195,813.

It is generally recognized that a balanced diet for humans consists of the six food groups: vegetables, bread, meat, milk, fruit and fat. These foodstuffs provide the vitamins, minerals, proteins and carbohydrates essential for good health. Each of these food groups have special functions in the maintenance of vital metabolic processes in the human body and have been shown to be necessary to meet normal nutritional requirements.

While disease or injury may result from lack of nutrients, or from consumption of a diet unsuitable for a particular disease, a far greater problem, and the reason for most dieting in the United States, is obesity. Obesity or accumulation of body fat results, as a rule, from the intake by a person of more food than is utilized or expended in the daily activities of living.

It is well known that the unit devised to measure the amount of nutrient energy provided by various foodstuffs is the calorie. One calorie, in nutrition, is the amount of heat energy that will increase the temperature of 2.2 pounds of water 1° Centigrade. Carbohydrates, fats and proteins are the chief source of calories. One gram (1/30 ounce) of these nutrients, when utilized by the body, supplies 4, 9, and 4 calories, respectively. It can thus be seen that where 1 gram of fat provides more than twice as much energy as an equal amount of either carbohydrates or proteins, a person who is overweight and wishes to reduce would be well advised to reduce his intake of fats such as rich gravies, cream dressings, greasy foods, fat spreads, and the like.

Vital statistics reveal that the mortality rate is lowest for adults who are 5 to 10 percent below average weight. This relationship is quite striking with respect to a number of specific diseases. All such evidence points to the desirability of maintaining body weight at approximately that which is standard or average for the population at age 25.

Prevention of obesity is easier and probably more beneficial to long-term health than reduction of excess weight. Prevention can ordinarily be accomplished by modest adjustments in diet and exercise.

In the past, certain methods and devices have been utilized to assist diet-conscious persons in their efforts to make caloric and foodstuff adjustments which are required to prevent obesity. None of the known prior art methods and devices have incorporated the combination of features and objectives as outlined in the foregoing summary of the invention.

SUMMARY OF THE INVENTION

A principal object of the subject invention is to provide a device which will give to those persons on diets a ready reference showing types and quantities of foods which may be consumed during each meal of any 24-hour time period.

Another object of the subject invention is to provide a programmer whereby menu substitutions may be made quickly and simply thereby providing mealtime variety for the diet-watcher with no loss in the accuracy of the overall calorie total as shown by the subject diet management device.

Another object of the subject invention is to provide, as a part of the device, a meal planner in the form of lists of food exchanges under principal food groups whereby foods having equivalent caloric values can be exchanged one for another within the group.

Another object of the subject invention is to provide an improved diet management device which will show at a glance what type and quantity of foodstuffs remain to be consumed during the remainder of a given 24-hour time period.

A further object of this invention is to provide a meal planner in the form of lists of quantities of principal foodstuffs allowable for breakfast, lunch and dinner and forming an integral part of the device whereby a person on a diet will know at a glance what type and quantity of said foodstuffs he may consume to stay within any given calorie total.

It is a further object of the subject invention to provide a means for controlling food intake whereby it is not necessary to remember in minute detail the amount of nutrients or calories in individual foods or groups; it is sufficient to know only that foods of certain groups are similar in their calorie content and be able to recognize the group to which various foods belong.

A still further object of the present invention is to provide a diet management device of simplified construction and low cost of manufacture which is portable and can be readily and conveniently carried upon the person.

The invention, accordingly, comprises a body portion, a cover portion superimposed over the body portion, indicia representing foodstuffs arranged columnarly on the inner surface of the cover portion, a sheet member having an array of apertures arranged in mutually perpendicular columns and rows, the columns aligned to form zones to represent foodstuffs, the rows superimposed over the foodstuff zones at right angles to represent time zones; a plurality of pegs removably secured within the apertures, the pegs color-coded to be indicative of foodstuffs comprising essential dietary components, the pegs being prepositioned within the apertures whereby the foodstuffs comprising the diet are visibly represented by the pegs.

Further features and objects of the invention will be apparent from an examination of the accompanying drawings which illustrate the invention.

BRIEF DESCRIPTION OF THE DRAWINGS

Similar reference characters refer to similar parts throughout the several views of the drawings.

DESCRIPTION OF THE PREFERRED EMBODIMENT

Figure 1:
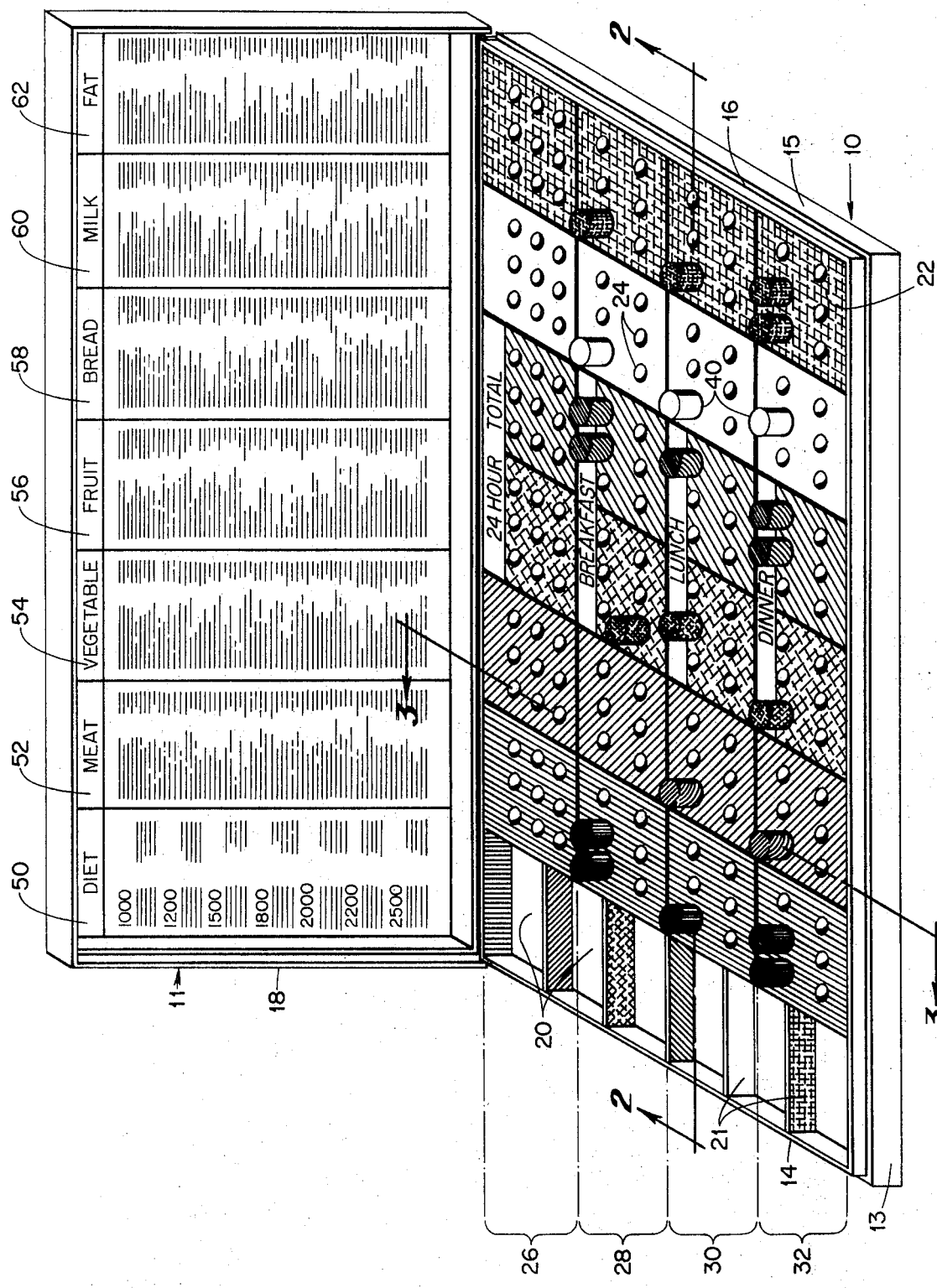
FIG. 1 is a perspective view of a device embodying the invention.
Figure 2:
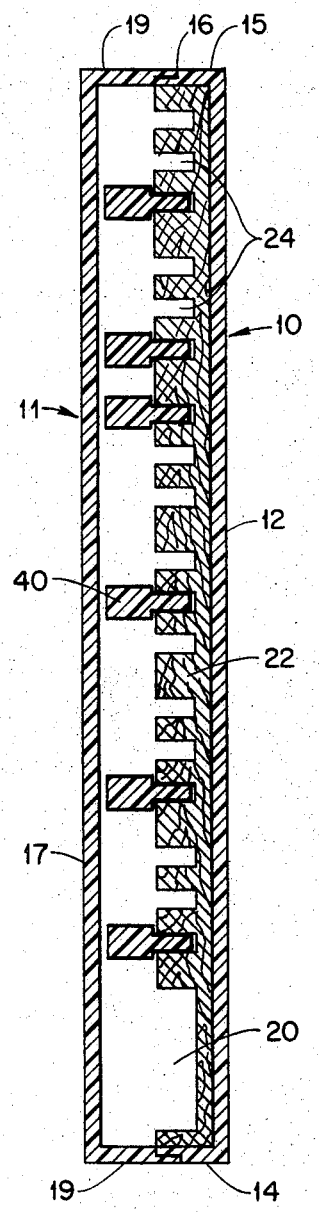
FIG. 2 is a sectional view taken along line 2—2 of FIG. 1 as viewed in the direction indicated by the arrows.
Figure 3:
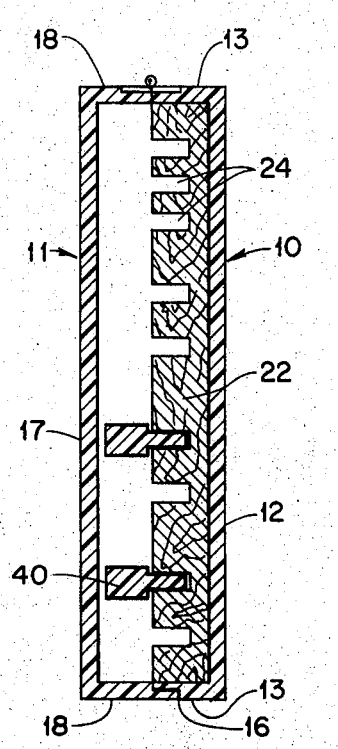
FIG. 3 is a longitudinal section taken upon line 3—3 of FIG. 1.
Figure 4:
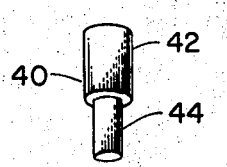
FIG. 4 is a preferred embodiment of the type peg utilized in this invention.

Having reference to the several drawings in detail, there is illustrated a perspective view of the invention showing a rectangular box comprising a body portion 10 and a cover portion 11 which may be manufactured from wood or metal or formed by molding a plastic composition. The body portion 10 comprises a base 12, side walls 13, a first end wall 14 and a second end wall 15. Side walls 13 and end walls 14, 15 are provided thereof with a rib 16 which serves as an abutment for cover portion 11. The cover portion 11 comprises a thin top panel 17, side walls 18 and end walls 19. Cover portion 11 is removable or may be hingedly mounted to body portion 10 by end wall 15, bottom 12 and side walls 13.

A plurality of aligned compartments 20 are formed by partitions 21 and are encased within body portion 10 by end wall 14, base 12, side walls 13 and sheet member 22 whereby pegs 40 may be stored until needed. Said partitions 21 and said pegs 40 are color-coded in the preferred embodiment to represent food groups 52, 54, 56, 58, 60 and 62 as follows: meats 52 red, vegetables 54 green, fruits 56 orange, breads 58 brown, milk 60 white, and fats 62 yellow. A plurality of foods are listed in columnar form on the inside surface of cover 11 whereby said meats 52, said vegetables 54, said fruits 56, said breads 58, said milk 60, and said fats 62 can be chosen to fulfill the allowable quantities for a specific diet as provided for in diet column 50.

Basic to the concept of this invention is the ability to exchange one or more servings of one kind of foodstuff within a food group with a serving of a different kind of food within the same food group. These foodstuffs, as represented by color-coded removable pegs 40, are the means for attaining a multiplicity of different menus while maintaining representation within the six essential food groups required for a balanced diet.

Sheet member 22 has drilled therein an array of holes 24 aligned in columns and rows, said columns aligned to form zones to represent foodstuffs, said foodstuff zones color-coded to represent essential dietary groups. Said rows are superimposed over said foodstuff zones at right angles to represent time zones comprising one full day and three meals within said day. Thus, where pegs 40 are inserted into holes aligned in rows at 26 it is an indication of allowable foods to be consumed during a 24-hour time period; holes having pegs bracketed at 28 indicate foods to be consumed for breakfast; holes aligned in bracket 30 indicate luncheon foods while pegs in bracket 32 stand for foods to be eaten at dinner.

In the preferred embodiment of the invention, removable pegs 40 comprise an upper larger portion 42 and a lower smaller, rounded portion 44, said lower, smaller portion 44 being of a size which can be easily and conveniently secured or removed from holes 24 drilled into sheet member 22. Said pegs 40 are color-coded according to the aforedescribed scheme whereby a person utilizing the subject invention can tell at a glance: (1) types and quantities of foods which may be consumed during a 24-hour time period; (2) types and quantities of foods which have been consumed during the preceding meals of any 24-hour time period; or (3) having consumed one or two meals during said period, a person can tell what types and quantities of food can still be consumed to remain within the limits of the allowable calorie total.

The quantities of food, for example, which will be allowed for a person on a 1500 calorie diet, as taken from diet column 50 will include five meat exchanges, two vegetable exchanges, three fruit exchanges, five bread exchanges, three milk exchanges and four fat exchanges. Thus, while the overall quantity of food for a specific diet is limited, the dieter has several options. He may consume all, or none, or part of his meat exchanges, for example, at a single meal. He may do the same for each of the six food groups 52, 54, 56, 58, 60 and 62. An important feature of the subject invention is that regardless of the mode in which it is used the person on a diet is enabled to keep track of both the kinds of foods and the quantity thereof which he is allowed to consume during the day.

In one embodiment, as shown in FIG. 1, the dieter has divided his food exchange pegs 40 into a set menu for the day. The pegs have been arranged so that meat, fruit, bread, milk and fat are present in each of the three daily meals as shown by holes aligned in rows 28, 30, 32 representing breakfast, lunch and dinner, respectively. Vegetables 54 are present at lunch 30 and dinner 32. Each peg of the same color stands for a serving of equivalent numbers of calories as every other peg of that color. These equivalencies, or food exchanges, as provided for in the indices 52, 54, 56, 58, 60 and 62 enable the dieting person to have a nearly limitless combination of different menus while still observing calorie limitations as may be required by a physician.

In the case where a person changes his mind concerning a planned menu and wishes to provide himself a larger dinner than originally planned, for example, he may simply move pegs representing some of the allowed portions for other meals into holes aligned along rows 32 representing dinner. Of course, once a meal has been consumed, the pegs representing those foods and portions consumed are not transferable. Only pegs representing foods and portions not consumed at any particular meal may be transferred for later consumption.

A preferred embodiment of this invention has been set forth in the description and drawings. These descriptions are used in the generic sense only and not for purposes of limitation. Various changes may, therefore, be made therein without departing from the spirit and scope of the invention.

What is claimed is:

1. A diet management device for use in programming meals which comprises, in combination:
   a. a container having a body portion and a cover portion,
   b. a thin sheet member within said body portion wherein located an array of aperatures apertures arranged in a plurality of mutally perpendicular columns and rows,
   c. indicia representing foodstuff groups arranged columnarly on the inner surface of said cover portion and wherein extensions of said columns extend across said sheet members and define specific foodstuff zones therein, each of said columns being of a unique color,
   d. a multiplicity of removable, colored pegs conveniently rounded to be rotatably secured in said apertures, the pegs used in each of said columns being of the same color as the respective column, whereby servings of foodstuffs of known caloric value comprising the diet are visibly represented by said pegs, and e. indicia representing time zones arranged in rows on said sheet member at right angles to and superimposed over said foodstuff zones whereby space is provided for said removable pegs to represent servings from any of said foodstuff groups in any of said time zones.

2. A diet management device as defined in claim 1 and wherein said removable pegs have equivalent caloric value within each of said foodstuff groups whereby a serving of one foodstuff is equivalent to and may be exchanged for a different foodstuff in the same foodstuff group.

3. A diet management device as defined in claim 1 and wherein said indicia representing foodstuff groups comprises foods having equivalent caloric values which can be exchanged one for another within said foodstuff group.

4. A diet management device as defined in claim 1 and having included therein a plurality of aligned compartments wherein said removable pegs may be stored.

\* \* \* \* \*